Nov. 5, 1929.  F. H. WOOLF  1,734,103
COATING MACHINE
Filed May 2 , 1924     5 Sheets-Sheet 3
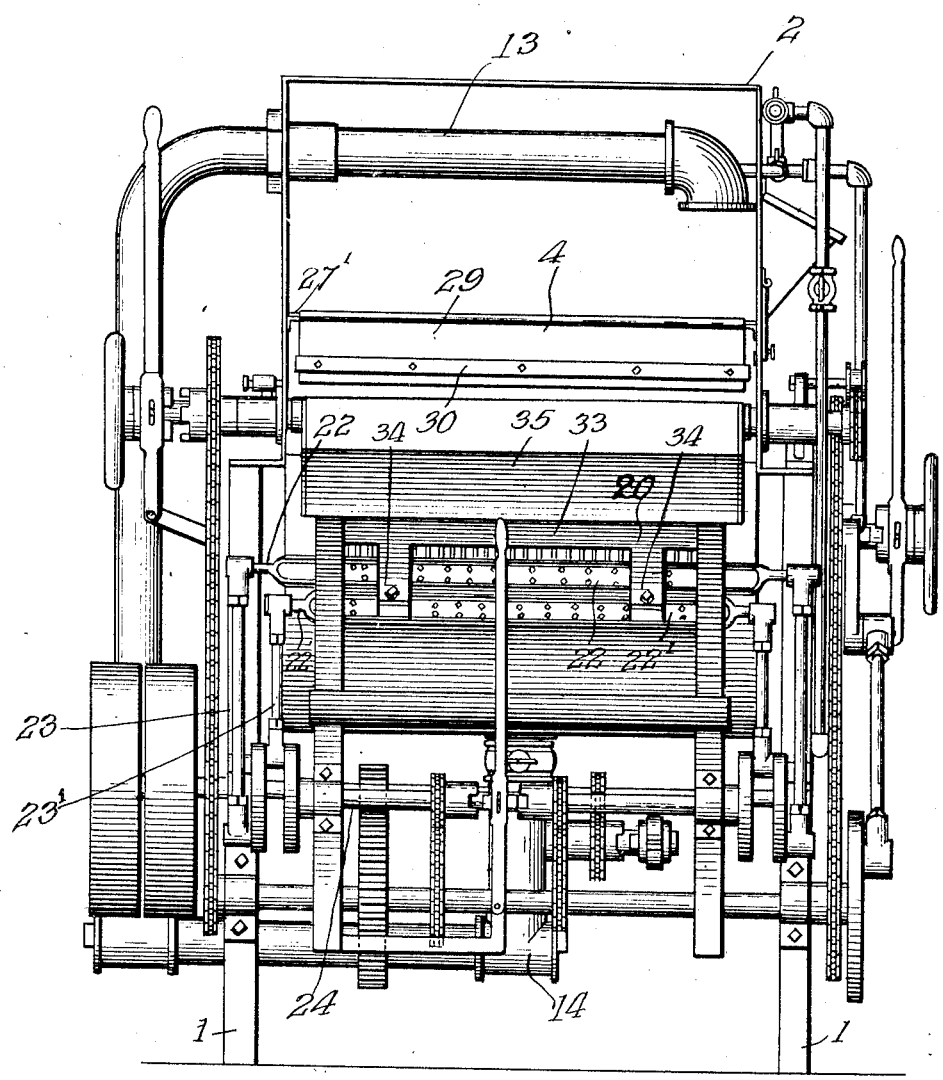
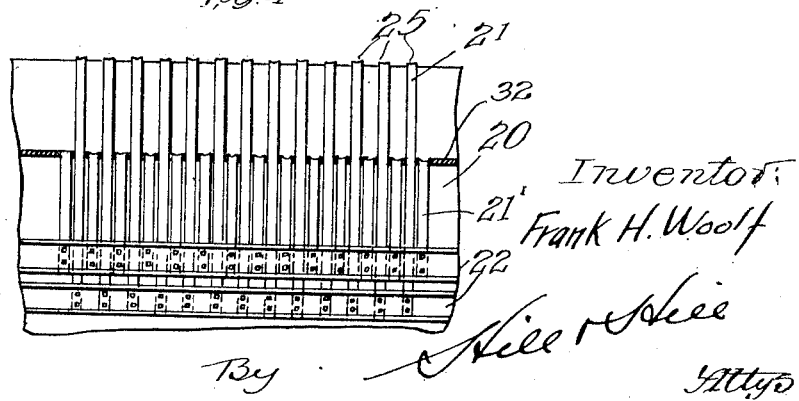

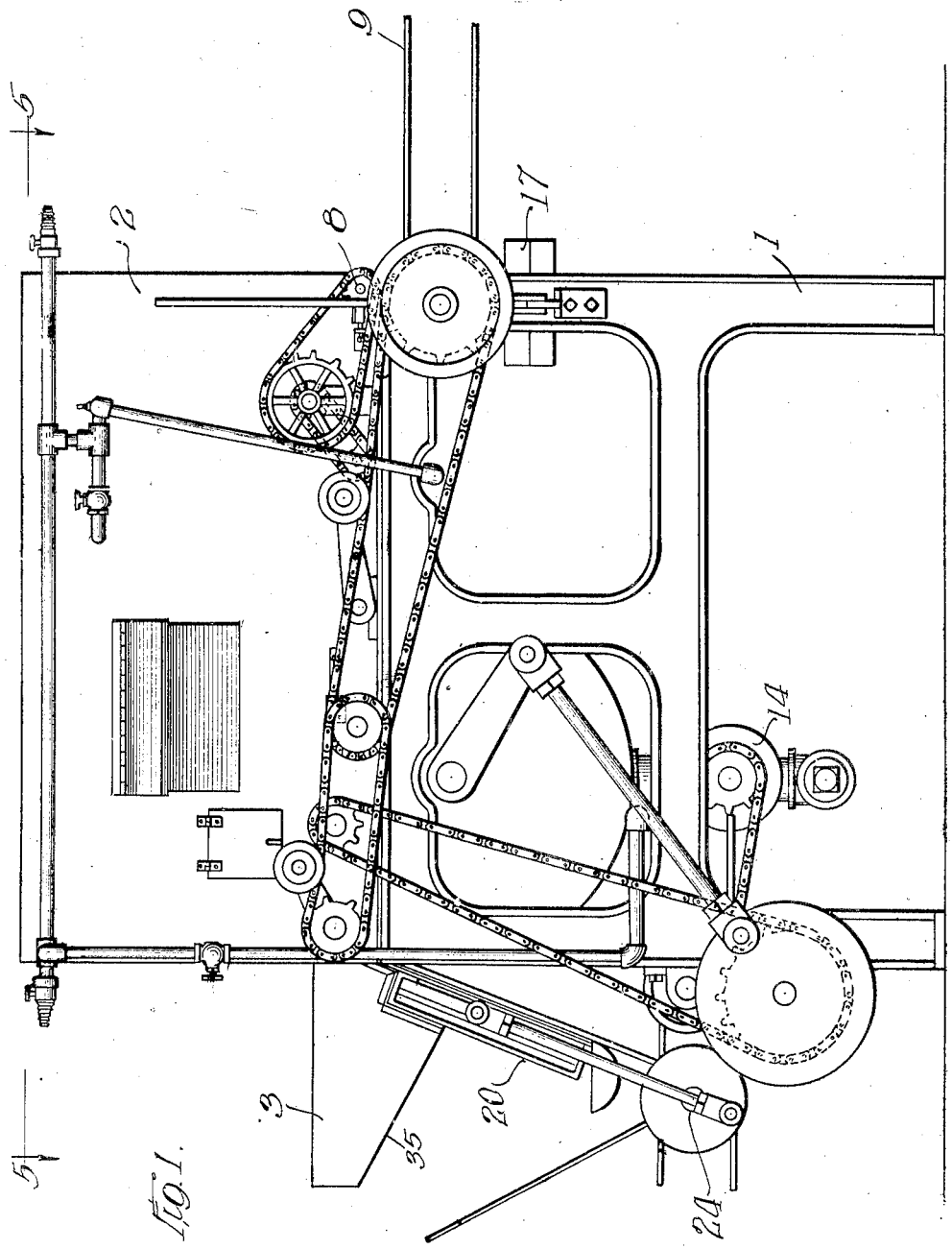

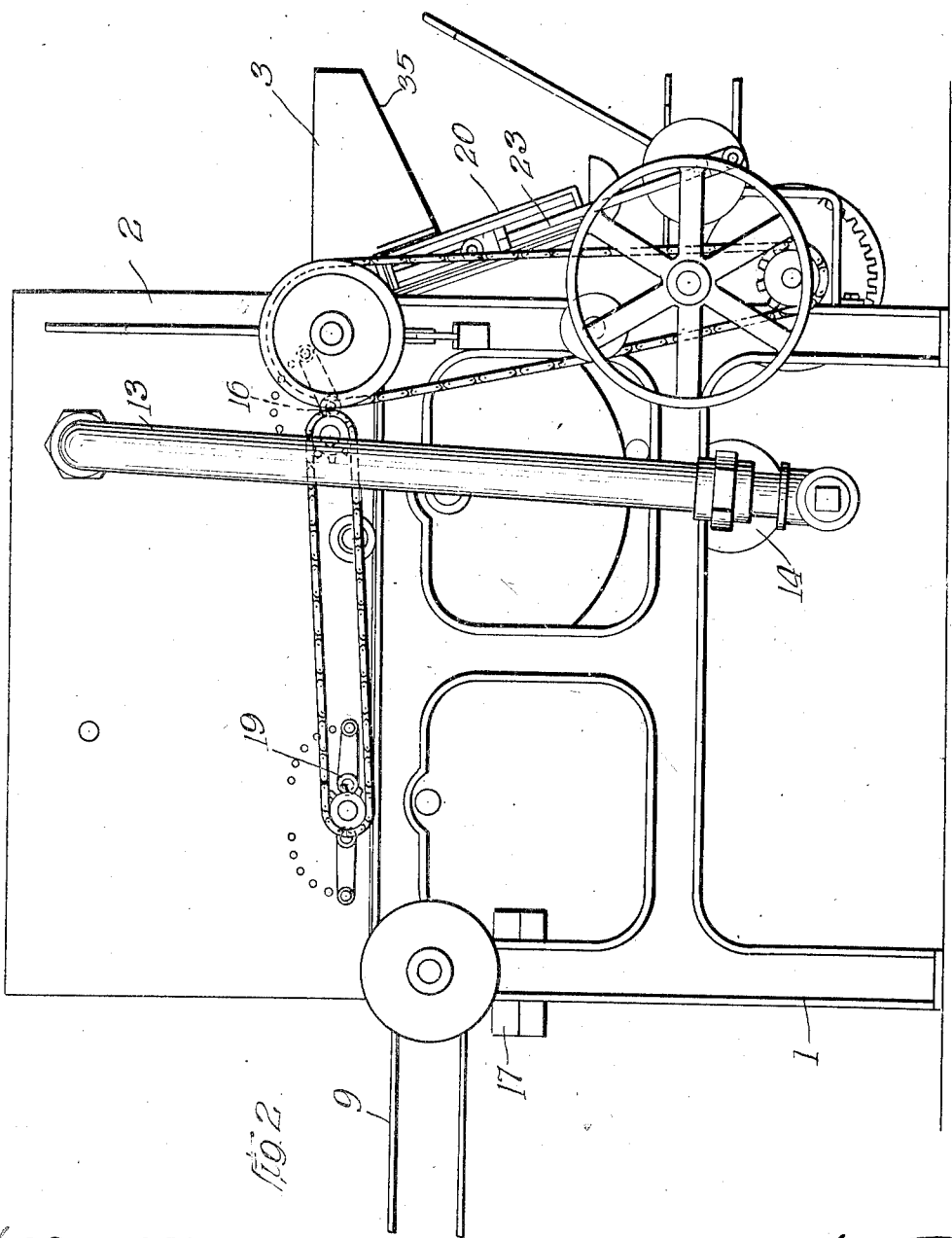

Nov. 5, 1929.　　　　F. H. WOOLF　　　　1,734,103
COATING MACHINE
Filed May 21, 1924　　　5 Sheets-Sheet 4
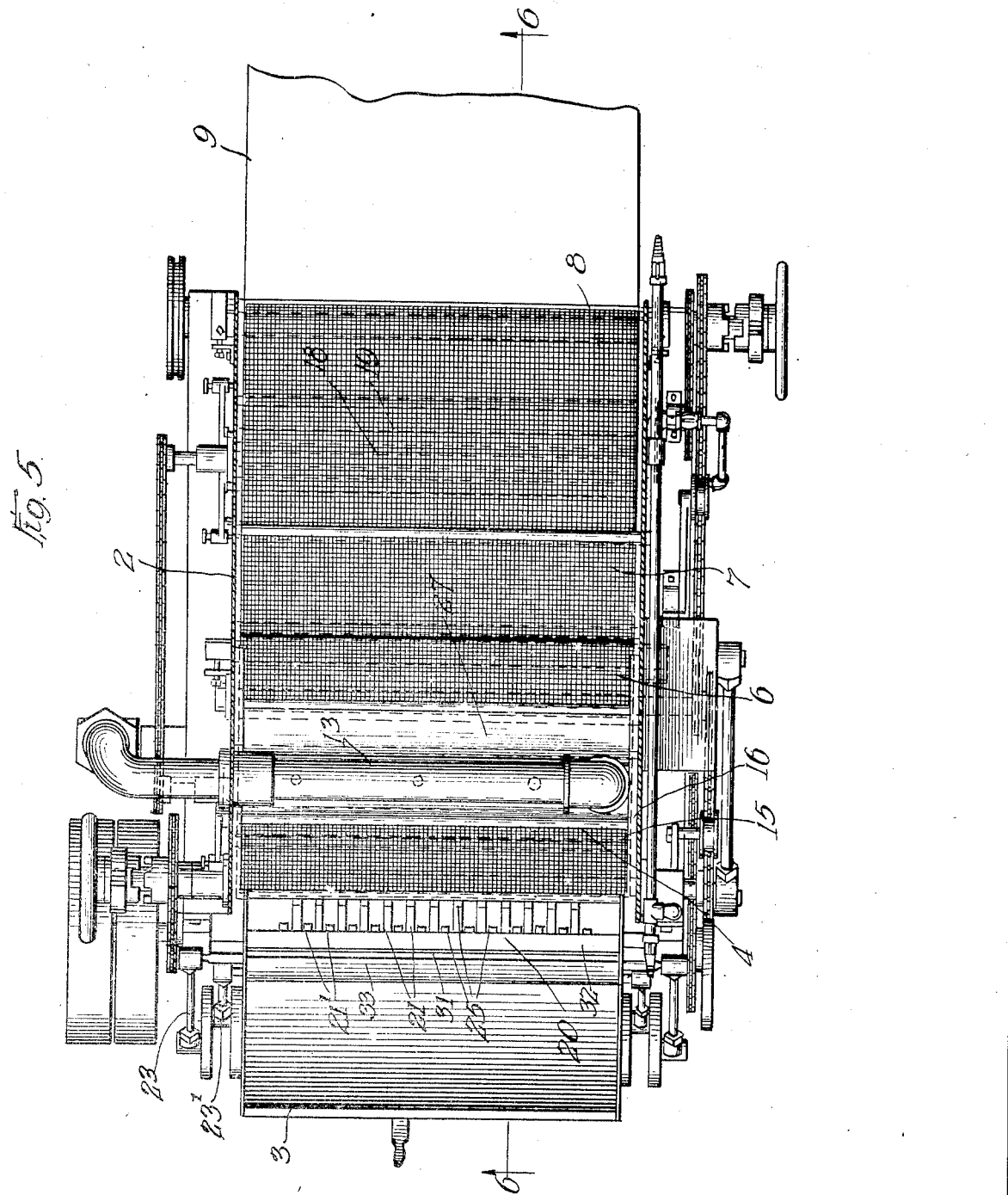

Nov. 5, 1929.  F. H. WOOLF  1,734,103
COATING MACHINE
Filed May 21, 1924    5 Sheets-Sheet 5
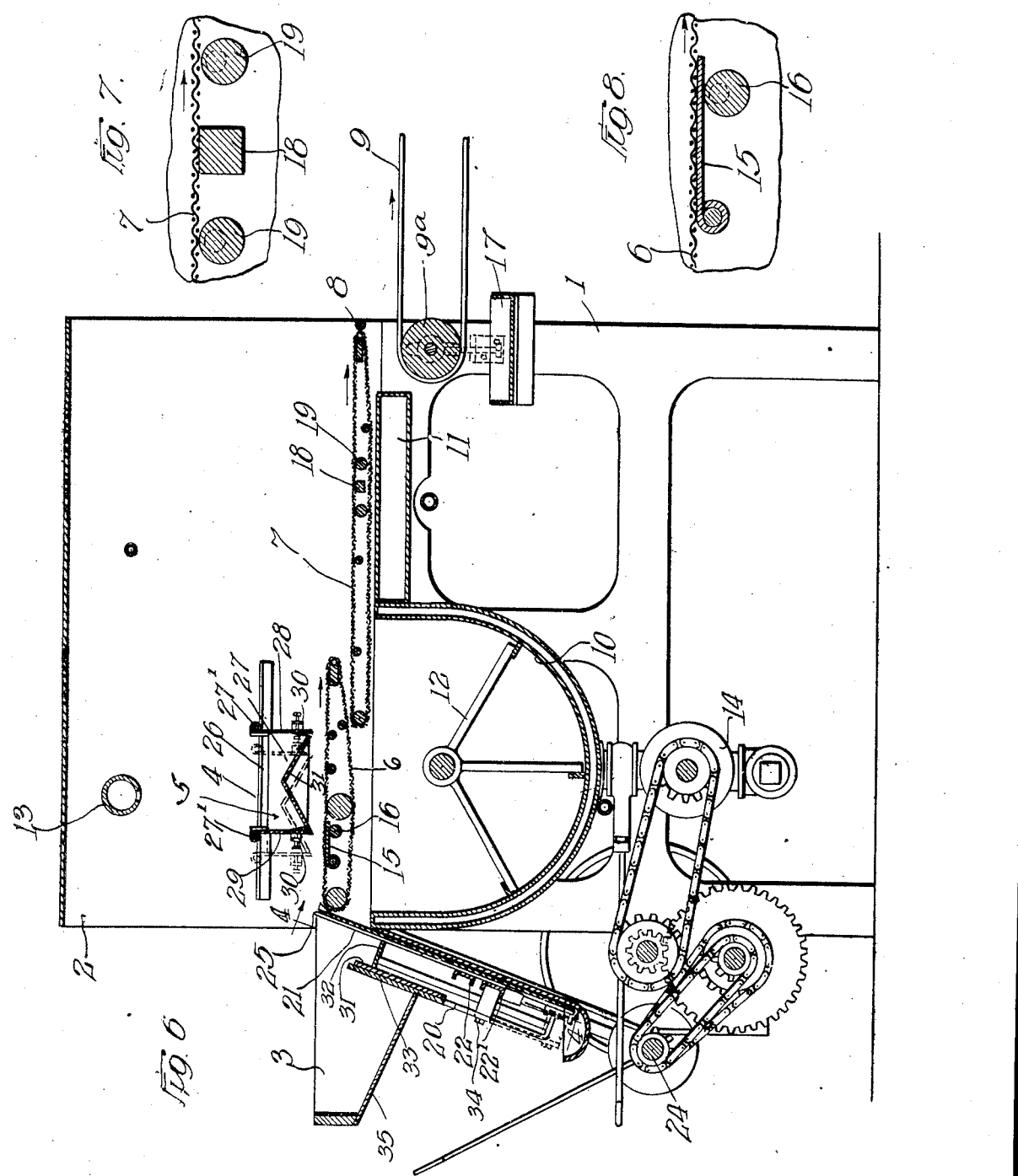

Patented Nov. 5, 1929

1,734,103

UNITED STATES PATENT OFFICE

FRANK H. WOOLF, OF ELGIN, ILLINOIS, ASSIGNOR TO SAVAGE BROS. CO., OF CHICAGO, ILLINOIS, A CORPORATION OF ILLINOIS

COATING MACHINE

Application filed May 21, 1924. Serial No. 714,959.

My invention relates to that general class of devices known as coating machines, especially intended for covering confections, nuts or other articles, with a coating or icing of 5 chocolate or the like.

The invention has among its objects the production of a device of the kind described, which is simple, compact, durable, convenient, efficient and satisfactory for use where10 ever found applicable.

The device has as an object the coating of the article individually and thence discharging them in a substantially dry condition with all excess coating removed, ready for packing 15 and shipment.

Many other objects and advantages of the construction herein shown and described will be obvious to those skilled in the art from the disclosures herein given.

20 To this end my invention consists in the novel construction, arrangement and combination of parts herein shown and described, and more particularly pointed out in the claims.

25 In the drawings, wherein like reference characters indicate like or corresponding parts:

Fig. 1 is a side elevation of the preferred type of machine;

30 Fig. 2 is an elevation of the reverse side thereof;

Fig. 3 is a front elevation of the machine;

Fig. 4 is a section taken substantially on the line 4—4 of Fig. 6;

35 Fig. 5 is a section taken substantially on the line 5—5 of Fig. 1;

Fig. 6 is a section taken substantially on line 6—6 of Fig. 5;

Fig. 7 is a sectional detail showing the belt 40 vibrating means; and

Fig. 8 is a fragmentary sectional detail showing the means for regulating the thickness of coating.

Referring to the drawings, wherein I have 45 illustrated the preferred embodiment of my mechanism, 1 indicates a frame of the desired size, shape and material having an enclosure or casing 2 at the upper end thereof. A hopper or magazine 3 is arranged adjacent one 50 end of the enclosure 2 and into which a supply of nuts, confections or other articles are thrown and from which they are fed separately through the coating mechanism. A trough or receptacle 4 is arranged within the enclosure 2 and has discharge openings 5 extending transversely of the enclosure and through which the coating material flows.

A carrier or conveyor belt 6 is arranged below the discharge opening of the trough 4, leading from the supply hopper 3. Adjacent the discharge end of the belt 6 is a second belt 7, traveling in the same direction and preferably at a slightly increased speed. The belts 6 and 7 are preferably reticulated or have openings therethrough so that any excess coating material may drop through the belt into suitable receptacles therefor.

A roller 8 is arranged at the discharge end of the belt 7, travelling at a speed greater than said belt. A belt 9 is arranged below the belt 7 at its discharge end, the same leading to any suitable point where the articles may be packed for shipment. As shown (see Fig. 6), the pulley or roller 9ª for the conveyer 9 is adjustably mounted on the frame so that it may be raised or lowered as desired, depending on the confection being made. Generally, when making bars, I prefer to drop the roll 25 below the point that it is normally used in some of the other confections; and I may also mention that when making bars I prefer to remove roller 8.

Beneath the carrier belts is arranged a system of reservoirs including a supply tank 10 for holding the supply of coating material, this receptacle or tank being preferably steam-jacketed as shown, and if desirable the steam jackets may be arranged beneath other parts of the belt as at 11. Piping is arranged to lead all of the dripped coating back to the tank 10.

An agitator 12 is mounted to rock within the tank 10 so as to keep the material therein of the desired uniform consistency, this tank communicating with a pipe 13 having openings discharging into the trough 4. A pump 14 is arranged to pump the coating from the tank 10 through the pipe 13.

The articles are discharged separately onto the belt 6 in a manner to be hereinafter more clearly described and travel slowly therealong under the discharge opening of the trough 4 so that the coating material covers the articles, the excess coating dropping into the tank 10.

In order to regulate the thickness of the coating, an apron 15 is arranged beneath the upper side of the belt 6, as shown more clearly in Fig. 8, this apron being hinged at one end and cooperating with an eccentrically mounted shaft 16 at its other end. By partially rotating the shaft 16 the free end of the apron will be moved toward or from the upper portion of the belt 6. As has been described in my previous Patent, 1,460,189 of June 26, 1923, the raising of the apron tends to retard the flow of the coating material, which is in a liquid state and flowing slowly, thereby increasing the thickness of coating, and when depressed the flow of the material is accelerated, as the material escapes faster through the meshes of the belt, resulting in a thinner coat.

The articles travel slowly along the belt 6 and have their coating partially hardened and then pass onto the faster traveling belt 7, whence they travel over the rotating shaft or bar 8 and are then thrown onto the belt 9. The roll 8, traveling at a greater speed than the belt 7, engages the coated articles and draws the coating into a ridge at the line of contact therewith and strings it out as it throws the articles onto the belt 9, thus producing a hand-dipped appearance of the coating. The receptacle 17 is connected up with the pipe line through the pump so that the coating dropped thereinto is not wasted, but is returned to the tank 10.

In order to insure that all of the excess coating from the articles and from the belt will be removed to its fullest extent, I have found it desirable in some cases to vibrate the belt 7 vertically during its travel. For this purpose I have arranged a shaft 18, preferably non-circular in cross section, as shown in Fig. 7, so that when said shaft is rotated during the forward travel of the belt, it will intermittently lift the belt and permit it to drop back, causing a vibratory movement of the same. One or more rolls 19 may be arranged or eccentrically mounted at opposite sides of the shaft 18 to engage with the belt and adjust or limit the amount of vibratory movement of the belt. When the rolls 19 are in the position shown in Fig. 7, the belt will have its greatest amount of vibratory movement and when the rolls are shifted the movement will be decreased.

Feeding mechanism 20 is arranged to cooperate with the supply hopper so as to eject the articles therefrom onto the belt 6. This feed mechanism comprises a plurality of plungers or rods 21 and 21' arranged in a row transversely across the hopper, the alternate plungers being connected by the bars 22 and 22', as shown more clearly in Fig. 4, so that the alternate plungers are actuated in unison.

Two series of plungers are thereby provided, 21 and 21', respectively, and actuating arms 23 and 23' are connected to the rods 22 and 22' so as to alternately actuate the series of plungers. The arms 23 and 23' are eccentrically mounted and driven by a shaft 24 in any suitable manner. The plungers are cupped or recessed at their free ends as at 25 so as to more easily engage the articles within the hopper. Each plunger is intended to engage a single article as they are moved upwardly through the hopper, the series of plungers discharging these articles in spaced relation onto the belt 6, whereby they are passed beneath the discharge opening of the trough, are coated, and thence carried away, having their excess coating removed and are sufficiently hardened or dried during their travel.

As most clearly shown in Fig. 6, there is in reality a hopper divided into two hoppers, a main hopper in which the articles are placed and an auxiliary hopper which receives and contains a limited amount of the articles and feeds them to the plungers. The hopper is provided with a cross partition 31 and with a shelf 32 adapted to receive a limited amount of articles. A feeding plate 33 is arranged in the hopper 3 and slidable between the bottom 35 and the top of the partition 31. The feeding plate is actuated by means of the rods 34 carried by one of the bars, as shown, bar 22'. Assuming that the hopper 3 contains the articles, as for example peanuts or the like, the feeding plat carries a limited number of these up ar they fall over into the auxiliary hopp through which the rods 21 and 21' project. If the auxiliary hopper is full, then they simply ride back and forth on the feed plate until the auxiliary hopper is not too full to receive them. This prevents the entire contents of the hopper 3 from being fed at one time toward the path of the feeding plungers or rods. It is found by providing this auxiliary feeding mechanism that a more uniform operation of the machine is secured.

Any suitable drive mechanism may be arranged to interconnect the moving parts of the machine so that they operate in unison in a predetermined manner, and suitable clutches or other means may be interposed at various points of the drive so as to further control the movement thereof.

While any suitable apparatus may be provided for discharging the chocolate coating or icing on the confection, my preferred construction is adjustable and so arranged that the coating discharged may be controlled to a very fine point. As shown, 26 represents a slide or bracket on each side of the machine which slidably or adjustably carries the coating receptacle or trough which receives its supply from the discharge pipe 13. The particular receptacle shown is supported by the rods 27' extending across the machine, and is provided with adjustable sides 28, 29, both sides being preferably adjustably and arranged so that the coating may be discharged from either side independently or from both at the same time. As shown, the bottom 31 is so arranged or inclined that the coating will tend to settle and flow out through the discharge openings 5 and not cool off to any extent. The size of the openings may be regulated by adjusting the members 30. This adjustment feature is somewhat similar to that shown in my patent referred to. For coating peanuts, as for example with a heavy coat, I generally prefer to adjust the discharge trough or receptacle 27 so that it is substantially as indicated in the full lines in Fig. 6. However, when coating raisins or the like and applying a light coat, I generally adjust same as indicated in the dotted lines. It should be kept in mind, however, that in the matter of adjustment of the receptacle on the brackets 26, as well as the adjustment of the sides 28 and 29 controlling the discharge from the trough, the various adjustments will depend to some extent on the articles to be coated, coating material used, temperatures, etc.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a coating machine, a receptacle having a discharge opening for coating material, conveyor means therebelow to receive the articles and move them past said opening, a rotary shaft non-circular in cross-section engaging said carrier means to vibrate the same vertically so as to shake off the excess coating from said articles, and rods engaging said carrier means and adjustably vertically to move the same relatively to said non-circular shaft so as to control the amount of said vibratory movement.

2. In a coating machine, a receptacle having a discharge opening for coating material, conveyor means therebelow to receive the articles and move them past said opening, a rotary shaft non-circular in cross-section engaging said carrying means to vibrate the same vertically so as to shake off the excess coating from said articles, and rods mounted eccentrically beneath said carrier for controlling the amount of said vibratory movement.

In testimony whereof, I have hereunto signed my name.

FRANK H. WOOLF.